C. SCHNEIDER.
COLOR SOLUTION MIXING TANK.
APPLICATION FILED MAR. 27, 1920.

1,354,850. Patented Oct. 5, 1920.

INVENTOR.
Carl Schneider,
BY
ATTORNEY.

UNITED STATES PATENT OFFICE.

CARL SCHNEIDER, OF WATERTOWN, NEW YORK.

COLOR-SOLUTION-MIXING TANK.

1,354,850.  Specification of Letters Patent.  Patented Oct. 5, 1920.

Application filed March 27, 1920. Serial No. 369,345.

*To all whom it may concern:*

Be it known that I, CARL SCHNEIDER, a citizen of the Republic of Germany, and a resident of Watertown, in the county of Jefferson and State of New York, have invented certain new and useful Improvements in Color-Solution-Mixing Tanks, of which the following is a specification.

This invention relates to a color solution tank or a mixing tank for dissolving the color granules or powder in water, the said invention having for its object, the provision of novel means for maintaining a circulation of the fluid while it is admitted to the tank containing the dye; and furthermore, to provide novel means for preventing the dye from settling at the bottom of the tank or becoming lumpy as often occurs when the water and dye are brought into contact.

A still further object of this invention is to produce a device or apparatus primarily intended for dissolving anilin colors and to deliver the color solution to the paper stock in the beater of a paper treating apparatus in proper condition. So far as is known, the present means of mixing the water and dye is to agitate the same by hand, and carelessness on the part of the operator often results in imperfectly prepared solutions.

By means of the apparatus forming the subject matter of this invention, the manual labor connected with the dissolving of color is materially reduced and simplified, and of course the cost of dissolving the anilin colorings is materially reduced.

A further object of this invention is to provide novel means for causing the water to whirl in the tank as it is being delivered, thus causing the commingling of the dye and water; and furthermore, the invention consists in providing means for determining the temperature of the water being delivered to the tank.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views and in which—

Figure 1:
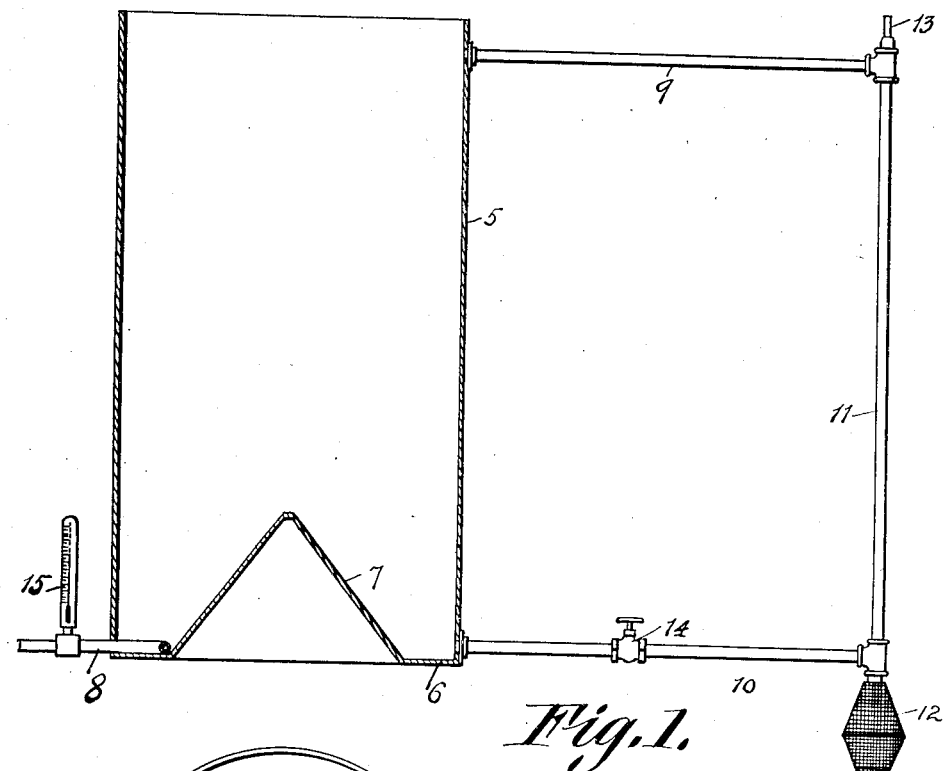
Figure 2:
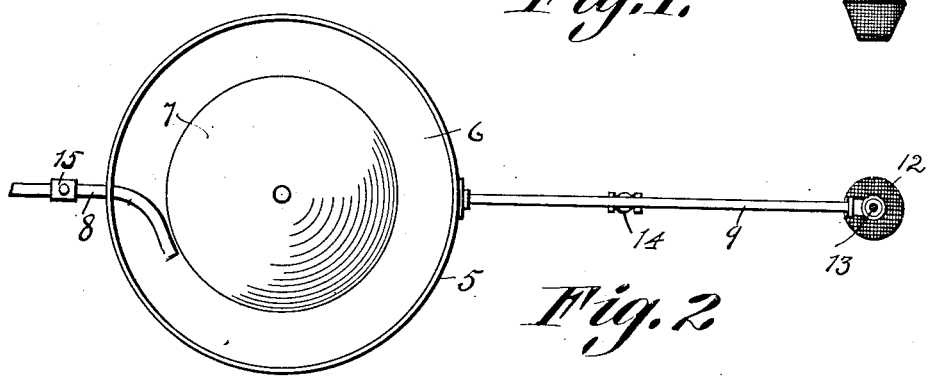

Figure 1 is a vertical sectional view of a tank with the connections thereto in elevation, and Fig. 2 is a top plan view of the said device.

In these drawings, 5 denotes a tank having its bottom near the wall, flat, as shown at 6, whereas the central portion of the said bottom is conical, as shown at 7. The tank has a water supply pipe 8 extending into it at the bottom, and the discharge end of the said pipe extends partially around the cone 7 so that the water in passing from the discharge end of the pipe will be directed around the cone and around the wall of the tank.

A discharge pipe 9 is connected to the tank near its top, and a second discharge pipe 10 is connected to the tank near the bottom, the two pipes 9 and 10 having a header 11 terminating in a strainer 12 at the lower end. The upper end of the header has a coupler 13 for supplying cold water, it being understood that the pipe 8 is intended to deliver hot water to the tank, as the anilin dye is dissolved to better advantage when subjected to the action of the hot water.

In carrying the invention into practice, the water is delivered to the tank, and owing to its being delivered with considerable pressure, it circulates around the cone with a whirling motion, thereby carrying the anilin colorings so that there is no likelihood of the said colorings settling on the bottom of the tank. The said action insures proper commingling of the dyes or colorings and the water, and in practice, when the water in the tank has reached about one-half of the height of the cone, the coloring matter is added to the water while the water is still running. The water is kept running in the tank until the fluid reaches the outlet pipe 9, and it has been found in practice that after the fluid has been running out of the pipe 9 for about one minute the solution is properly mixed and ready to be drawn from the tank. When this step of the process has been reached, the valve 14 in the pipe 10 may be opened and all of the solution in the tank may be allowed to run out through the sieve 12. It sometimes happens that the color solution has to be diluted somewhat or reduced in temperature by the addition of cold water, and when that is necessary, water can be supplied through the pipe 13 to the header 11 and a proper mixture can be had.

In order to regulate the temperature of the water being admitted to the tank, or to know the temperature of the water being supplied, the pipe 8 has a thermometer 15 interposed which would be affected by the temperature of the inflowing water, and an operator may be sure that he has conditions which will produce the best results. I prefer that the pipe 8 shall enter the tank at an angle of about 45 degrees, although I do not wish to be limited with respect to this, as any angle which will produce the desired result will come within the scope of the invention.

The flat bottom around the cone permits the color to spread so that it prevents lumping, and at the same time, it perfects circulation of the elements, and of course the presence of the strainer or sieve 12 is a safeguard for the paper stock to prevent undissolved particles of coloring matter from entering the beater.

I claim:

1. In a color solution mixing tank, a receptacle having a flat bottom near the wall of said receptacle and an upwardly projecting conical center portion, a supply pipe for water extending into the tank at the bottom and discharging at an angle therein, a pipe leading into the tank near the top thereof, and a pipe communicating with the tank at the bottom thereof.

2. In a color solution mixing tank, a receptacle having a bottom, the said bottom being flat near the side of the tank and having a conical central portion, a pipe leading into the tank at the bottom for delivering fluid, the said pipe having its discharge end lying at an angle, a pipe connected to the interior of the tank near the top, a valved pipe communicating with the tank near the bottom, a header connecting the said upper and lower pipes, a strainer on the lower end of the header, and a cold water supply pipe at the top of the said header.

CARL SCHNEIDER.